United States Patent
Buijs et al.

(10) Patent No.: US 8,585,300 B2
(45) Date of Patent: Nov. 19, 2013

(54) FERRULE WITH ALIGNMENT PIN CHANNELS

(75) Inventors: Marcellus P. J. Buijs, Ede (NL); Jeroen Antonius Maria Duis, Didam (NL); Jan Willem Rietveld, Benschop (NL); Antonius Bernardus Gerardus Bolhaar, Ophemert (NL); Paul Schneider, Gemonde (NL); Joseph Gerardus Maria Vos, Elsendrop (NL); Jacco Elenbaas, Heijningen (NL)

(73) Assignee: Tyco Electronics Nederland BV, Hertogenbosch (NL)

( * ) Notice: Subject to any disclaimer, the term of this patent is extended or adjusted under 35 U.S.C. 154(b) by 249 days.

(21) Appl. No.: 13/023,561

(22) Filed: Feb. 9, 2011

(65) Prior Publication Data

US 2012/0201499 A1 Aug. 9, 2012

(51) Int. Cl.
*G02B 6/36* (2006.01)

(52) U.S. Cl.
USPC .......................................................... 385/78

(58) Field of Classification Search
None
See application file for complete search history.

(56) References Cited

U.S. PATENT DOCUMENTS

| 5,420,954 | A  | * | 5/1995  | Swirhun et al. ............... 385/92 |
| 5,596,662 | A  | * | 1/1997  | Boscher ........................... 385/55 |
| 5,778,123 | A  | * | 7/1998  | Hagan et al. .................... 385/76 |
| 6,805,493 | B2 | * | 10/2004 | Igl et al. .......................... 385/88 |
| 6,910,812 | B2 | * | 6/2005  | Pommer et al. ................. 385/92 |
| 2002/0114589 | A1 | * | 8/2002 | Igl et al. .......................... 385/88 |

FOREIGN PATENT DOCUMENTS

| JP | 7318761 A      | 12/1995 |
| WO | WO 02088810 A1 | 11/2002 |

OTHER PUBLICATIONS

European Search Report, European Application No. 12153730.2-2217, European Filing Date Feb. 2, 2012.

* cited by examiner

*Primary Examiner* — Sung Pak

(57) ABSTRACT

An optical ferrule comprising: (a) a body defining an end face; (b) one or more channels extending from said end face through said body, each channel adapted to receive an optical fiber; and (c) first and second alignment pin channels defined in said end face, each alignment pin channel having a center point, said center points being disposed along a first axis, said first alignment pin channel having a first cross section essentially the same as that of an alignment pin and being adapted to receive said alignment pin, said second alignment pin channel having a second cross section elongated along said first axis.

12 Claims, 2 Drawing Sheets

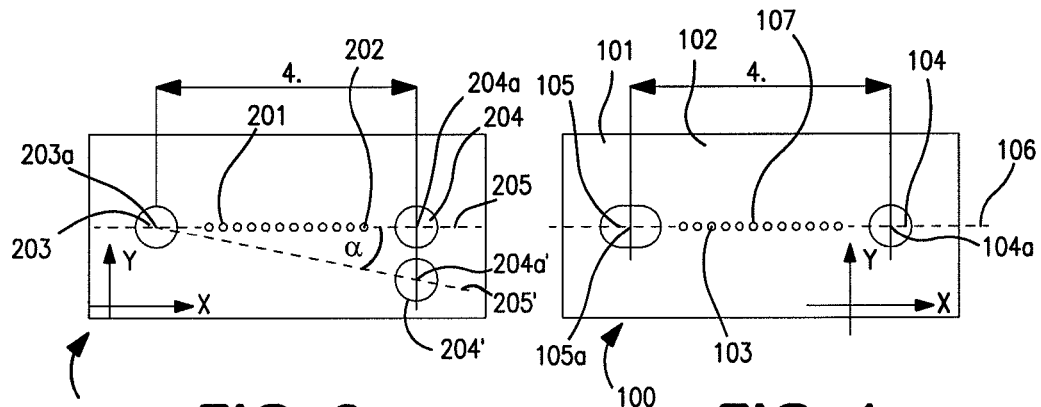
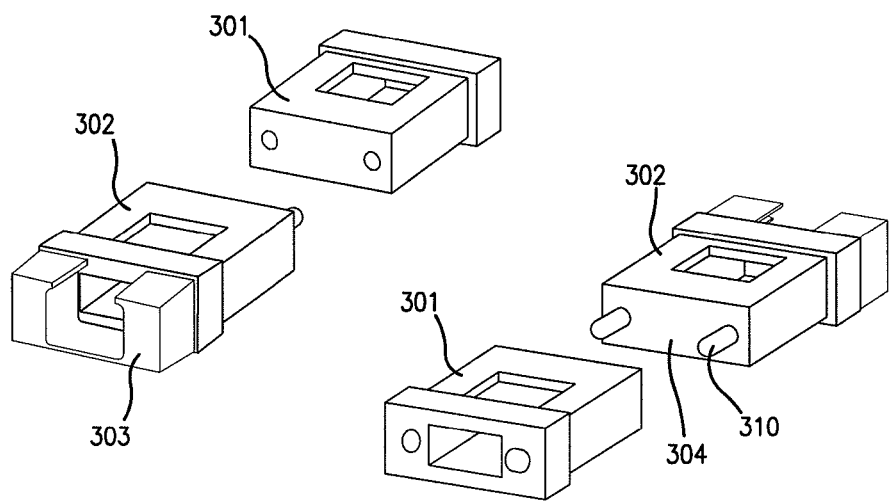

FERRULE WITH ALIGNMENT PIN CHANNELS

FIELD OF INVENTION

The present invention relates generally to ferrules for optical connectors, and, more specifically, to MT ferrules.

BACKGROUND

Optical fiber connectors are an essential part of substantially any optical fiber communication system. For instance, such connectors are used to join segments of fiber together, to connect fiber to active devices such as radiation sources, detectors and repeaters, and to connect fiber to passive devices, such as switches, multiplexers, and attenuators.

A typical optical fiber connector comprises housing and a ferrule assembly within the housing. The ferrule assembly comprises a ferrule, which has one or more fiber channels to accommodate fibers, and a fiber secured in each channel such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially and laterally aligned with optical pathway of the mating structure. This way, light from the fiber is optically coupled to the optical pathway. If the cores of the mating fibers are not precisely aligned, the optical coupling suffers attenuation.

Of particular interest herein, are ferrules having alignment features such as the mechanically transferrable (MT) ferrule 200, shown in FIG. 2. The MT ferrule 200 is generally used for multi-fiber applications and thus has a row 201 of fiber channels 202, and is characterized by alignment pin channels 203 and 204 defined at each end of the front face of the ferrule. Alignment pins (not shown) are inserted in the alignment pin channels of mating ferrules such that the ferrules mate in a precise orientation, thus ensuring that the cores of fibers held in the mating ferrules are aligned.

To ensure proper alignment, the alignment pin channels are positioned to minimize angular misalignment. Specifically, referring to FIG. 2, the alignment pin channels 203, 204 have centers 203a, 204a, respectively, which are aligned along an axis 205. It is important that the axis be as close as possible to parallel with the row 201 of fiber channels 203. (In the ferrule 200 shown in FIG. 2, the row is coincident with the axis 205, although in multiple row MT ferrules this would not be the case.) Having the axis 205 parallel to the row 201 is an important parameter to ensure that the fiber cores of mating ferrules are aligned. By way of contrast, if the alignment pin channel 204' were offset along the y axis as shown (greatly exaggerated), the axis 205' joining the centers 203a and 204a forms an angle α with the row 201. This angle α is referred to herein as angular misalignment.

The tolerance for angular misalignment of MT ferrules has become more stringent as the use of the MT ferrule has evolved. The MT ferrule was initially introduced as a multi-mode ferrule. A multi-mode fiber has a relatively large core diameter of about 50 microns, and thus aligning the cores of mating ferrules it relatively simple compared to single mode applications. Additionally, because multi-mode applications were usually short-distance applications, relatively high loss, for instance, about 1 dB, could be tolerated. Consequently, the tolerances of a multi-mode ferrule were relatively relaxed, allowing an angular misalignment of about one degree.

As the MT ferrule evolved and was applied to single mode applications, the angular tolerance was reduced. Specifically, a single mode fiber has a relatively narrow core of about 9 microns. Accordingly, any misalignment of a single mode fiber results in significant attenuation. Additionally, given the long range applications in which single mode fibers applications are typically used, very little loss can be tolerated, for example, less than 0.2 dB. Therefore, for the MT ferrules to accommodate this low loss requirement, the angular misalignment tolerance of a single mode MT connector is about 0.5 degrees. This is significantly less than the multi-mode application. Furthermore, in certain "low loss" single mode applications this angular misalignment is further limited to just 0.2 degrees.

Despite the exacting angular misalignment tolerance and other tight tolerances of the single mode MT ferrules, Applicants have discovered several problems with their performance. In particular, performance repeatability of mated MT single mode ferrules varies considerably. For example, a particular optical coupling in mated single mode MT ferrules may be satisfactory in one instance, but when the ferrules are re-mated, its performance may drop considerably. Additionally, Applicants have discovered that the optical coupling performance between fibers varies considerably during thermal cycling of single mode MT ferrules. For example, referring to FIG. 5, the attenuation of a given optical coupling varies with temperature cycling between 60 and −10° C. Moreover, Applicants discovered an initial jump in attenuation during the initial temperature cycle. The optical coupling's performance never recovered from this initial jump, even after the temperature was lowered.

Therefore, what is needed is an MT ferrule suitable for single mode applications that provides consistent optical performance over repeated mating cycles and thermal cycles. The present invention provides this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a ferrule that has improved optical performance by relieving stress between the alignment guide pins. Specifically, Applicants discovered that the close tolerance of the distance between the alignment pins often results in interference between the mating ferrules and the alignment pins during mating. As force is applied to mate the ferrules, the alignment pins and the ferrule around the alignment pins deforms, creating stress in the mated ferrules. This deformation and stress, in turn, affects the ferrules' alignment, ultimately affecting the alignment of the fiber cores. This is particularly problematic in single mode applications in which the core diameter is only nine microns. Thus even slight movement of the mating fiber cores relative to each other results in significant losses. Additionally, depending on how the ferrules were mated and where the stresses were concentrated, different optical fibers along the ferrule end face would be affected differently. Therefore, optical performance among the fibers would vary each time the ferrules were mated. Furthermore, because the pins and ferrule are stressed, during temperature cycling, when their modulus changes, the stress actually induces movement of the pins/ferrule relative to each, thereby further affecting optical performance. This is evidenced in FIG. 5 in the dramatic change in attenuation during the initial temperatures cycle.

To solve this problem, Applicants recognize that certain tolerances of the MT ferrule can be relaxed to avoid stress yet not compromise optical performance. In particular, Applicants recognized that the close tolerance between the alignment pin channels (e.g., 4.6±0.003 mm for MT MPO ferrules) is not necessary. Rather, all that is needed for fiber core alignment is a single alignment pin channel against which the fiber channels can be registered, and a second alignment pin channel to prevent angular misalignment of the ferrules. Accordingly, the ferrule of the present invention has one alignment pin channel that is closely toleranced around the alignment pin in two dimensions, thus providing a price location on the ferrule end face against which the fiber channels can be registered. The other alignment pin channel is closely toleranced only in one dimension to prevent angular misalignment of the ferrules. The other dimension is left loose to allow movement of the alignment pin and thus avoid stress.

This approach has a number of advantages. First, as mentioned above, it reduces the stress between the alignment pins and thereby improves the repeatability of the optical performance for the mated ferrules. Additionally, it is anticipated that, since only one alignment pin is used to register the fiber channels, the registration of the channels to this alignment pin channel will improved over time. Another benefit is that the molding processes is simplified as only one alignment pin channel needs to be closely toleranced in both dimensions. Still other advantages will be apparent to those of skill in the art in light of this disclosure.

Accordingly, one aspect of the present invention is a ferrule having one closely toleranced alignment pin channel and a second loosely toleranced alignment pin channel to allow movement of the alignment pin therein. In one embodiment, the ferrule comprises: (a) a body defining an end face; (b) one or more channels extending from the end face through the body, each channel adapted to receive an optical fiber; and (c) first and second alignment pin channels defined in the end face, each alignment pin channel having a center point, the center points being disposed along a first axis, the first alignment pin channel having a first cross section essentially the same as that of an alignment pin and being adapted to receive the alignment pin, the second alignment pin channel having a second cross section elongated along the first axis.

Another aspect of the invention is a connector comprising the above-mentioned ferrule. In one embodiment, the connector comprises: (a) a ferrule comprising at least: (i) a body defining an end face; (ii) one or more channels extending from the end face through the body, each channel adapted to receive an optical fiber; and (iii) first and second alignment pin channels defined in the end face, each alignment pin channel having a center point, the center points being disposed along a first axis, the first alignment pin channel having a first cross section essentially the same as that of an alignment pin and being adapted to receive the alignment pin, the second alignment pin channel having a second cross section elongated along the first axis; (b) one or more fibers, each fiber being disposed in one of the one or more channels; and (c) a housing for holding the ferrule.

BRIEF DESCRIPTION OF DRAWINGS

FIG. 1 shows a schematic of a front view of a ferrule of one embodiment of the ferrule of the present invention.

FIG. 2 shows a prior art MT ferrule.

FIG. 3 shows an MT ferrule of the present invention with alignment pins disposed therein and in position for mating.

DETAILED DESCRIPTION

Figure 4:
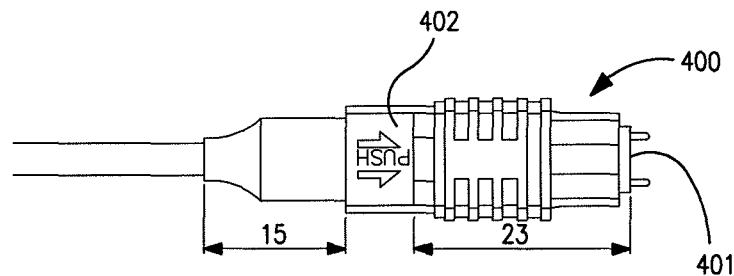
FIG. 4 shows an MPO connector comprising the ferrule of FIG. 1
Figure 5:
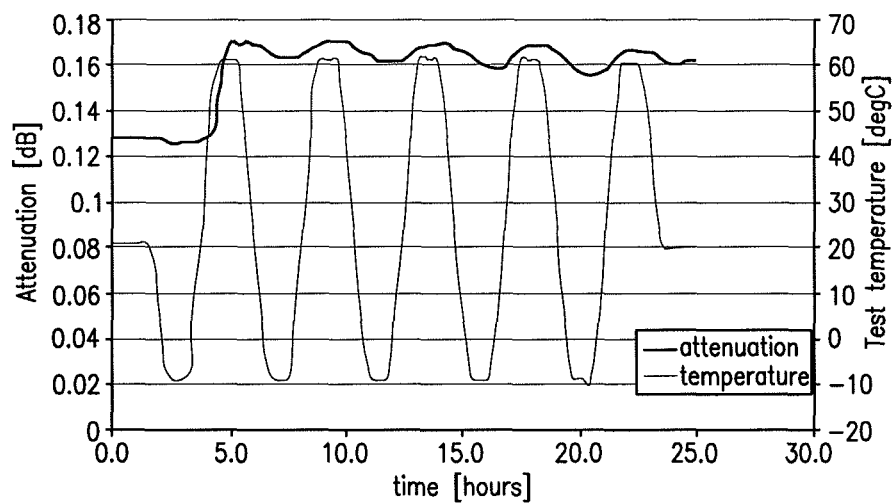
FIG. 5 shows a graph of attenuation as a function of thermal cycling.

Referring to FIG. 1, one embodiment of the ferrule 100 of the present invention is shown. The ferrule 100 comprises a body 101 defining an end face 102. One or more channels 103 extend from the end face 102 through the body 101. Each channel 103 is adapted to receive an optical fiber (not shown). The ferrule body also defies first and second alignment pin channels, 104, 105. Each alignment pin channel has a center point 104a, 105a, which are disposed along a first axis 106 (dotted line). The first alignment pin channel 104 has a first cross section essentially the same as that of an alignment pin 310 (see FIG. 3), and is adapted to receive the alignment pin. The second alignment pin channel 105 has a second cross section elongated along the first axis 106. Each of the elements is considered below in detail and with respect to alternative embodiments.

The body 101 of the ferrule serves to define the fiber channels 103 and the alignment pin channels 104, 105 and is suitable for being housed in a known connector, such as the MPO, MT-RJ, or the Lightray MPX® connectors (described below). Generally MT ferrules are made of polymeric material, such as highly glass-filled polyphenylene sulfide (PPS). It should be understood, however, that the present invention is not restricted to MT ferrules per se and can be practiced with any ferrule having alignment pin channels. Accordingly, the ferrule of the present invention may be produced from alternative materials, such as ceramic (e.g., zirconia) or metal (e.g., stainless steel, nickel-silver, titanium). Additionally, although MT ferrules are typically molded, the ferrules of the present invention may be manufactured using any know method, including molding and machining.

Fiber channels 103 are defined in ferrule to hold bare fiber securely. It should be understood that the term "channels" is used broadly herein to describe bore holes, V-grooves, or other known structure for holding a fiber. It is well known in the art how to form such fiber channels and the tolerances required therefor. Typically, although not necessarily, the fiber channels 103 are disposed between the alignment pin channels 103, 105 on the ferrule end face. Although MT ferrules typically comprise more than one fiber channel, it should be understood that the application is not limited to multi-channel MT ferrules and can be used with single fiber channels as well. In one embodiment, the ferrule comprises two or more fiber channels aligned in one or more rows 107 parallel to the first axis 106 of the ferrule as shown in FIG. 1. Although FIG. 1 shows just a single row 107 of fiber channels 103, it should be understood that the invention is not limited to a single row and may comprise two or more rows of fiber channels. For example, the invention may be practiced with a 72-fiber ferrule comprising six rows with 12 fibers in each row.

The alignment pin channels 104, 105 function to receive an alignment pin to align two mating ferrules. It should be understood, that the term "pin channel" is used broadly herein to refer to any channel to hold an alignment pin, including, for example, bore holes, V-grooves, U-grooves, or other known structure. Use of alignment pins is well known and their tolerances in MT ferrules is well documented, accordingly they will not be described herein in detail.

In one embodiment of the present invention, the first alignment pin channel 104 is essentially the same as that of a traditional MT type of ferrule and is configured to receive an alignment pin. For example, the alignment pin may have a circular cross section and a diameter of 0.6985±0.0005 mm, and the alignment pin channel may have a diameter of 0.7±0.001 mm. Ordinarily, the alignment pin channel is just a 1-2 microns larger than the alignment pin to ensure that the mating ferrules can use the alignment pin as a reference point from which to register other critical features, in particular, the fiber channels.

The second alignment pin channel 105 deviates from traditional MT type of ferrules. Specifically, it is elongated along the first axis 106 such that, an alignment pin is able to move along the first axis within the second alignment pin channel. As mentioned above, such arrangement relieves the stress between the alignment pins when the ferrules are mated.

Although the alignment pin is able to move within the second alignment pin channel along the first axis (i.e., x axis), it is not able to move or is closely toleranced in the perpendicular direction (i.e., y axis). Accordingly, in one embodiment, the y axis dimensions of the first and second alignment pin channel are essentially the same. By limiting this dimension and ensuring that the centerline of the alignment pin channels is parallel to the fiber channels, angular misalignment between the alignment pins is closely toleranced.

The configuration of the first and second alignment pin channels can vary according to the application. For example, as shown in FIG. 1, the first alignment pin channel has a circular cross section to match that of the alignment pin, while the second alignment pin channel is oval and thus is elongated along the first axis. Although circular and oval shaped pin channels are depicted, it should be understood that the invention is not limited to such configurations. For example, the first alignment pin channels may be configured to have a polygon cross section, such as a triangle (as would be the case with a V-groove as the alignment pin channel), square or octagon. Likewise, rather than an oval shape, the second alignment pin channel may be any shape elongated along a single axis, including elongated polygons such as a slot (elongated square), trapezoid (elongated triangle), or elongated octagon. Generally, it may be preferable to use rounded edges for molding purposes, although this is not necessary to practice the present invention.

The ferrule of the present invention can be used in any known connector using an MT ferrule. Referring to FIG. 3, a opposite perspective views of mating ferrules 301, 302 are shown. In this embodiment, the ferrule 302 comprises a pin keeper 303 which has projecting from it two identical alignment pins 310. The alignment pins 310 are inserted into the back of the ferrule 302 and the pin keeper pushed forward relative thereto, such that the alignment pins project from the end face 304 of the ferrule 302. The alignment pin channels of the mating ferrule 301 can now receive the alignment pins 310 to align the two ferrules. The pin keeper 303 and its interengagement with the ferrule is well known.

Typical connectors using the MT ferrule include, for example, the MPO connector, MP connector, MT-RJ connector, the Lightray MPX® connector (Tyco Electronics Corporation, Harrisburg, Pa.). Referring to FIG. 4, an MPO connector 400 is shown comprising the ferrule 401 of the present invention. The MPO has a housing 402 for holding the ferrule which is adapted for connection to an adaptor (not shown). The details of this housing are not described herein as they are known in the prior art.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. An optical ferrule comprising:
a body defining an end face;
one or more channels extending from said end face through said body, each channel adapted to receive an optical fiber; and
first and second alignment pin channels defined in said end face, each alignment pin channel having a center point, said center points being disposed along a first axis, said first alignment pin channel having a first cross section essentially the same as that of a first alignment pin and being adapted to receive said first alignment pin, said second alignment pin channel having a second cross section elongated along said first axis and being adapted to receive a second alignment pin having a cross section essentially the same as that of said first alignment pin channel.

2. The ferrule of claim 1, wherein said first cross section has a y-dimension perpendicular to said first axis, and wherein said second cross section has essentially the same y-dimension.

3. The ferrule of claim 1, wherein said first cross section is a circle, and said second cross section is an oval or slot.

4. The ferrule of claim 1, wherein said one or more channels comprises two or more channels aligned parallel to said first axis.

5. The ferrule of claim 4, wherein said ferrule is an MT-type ferrule.

6. An optical connector comprising: a ferrule:
a body defining an end face;
one or more channels extending from said end face through said body, each channel adapted to receive an optical fiber;
first and second alignment pin channels defined in said end face, each alignment pin channel having a center point, said center points being disposed along a first axis, said first alignment pin channel having a first cross section essentially the same as that of a first alignment pin and being adapted to receive said first alignment pin, said second alignment pin channel having a second cross section elongated along said first axis and being adapted to receive a second alignment pin having a cross section essentially the same as that of said first alignment pin channel;
one or more fibers, each fiber being disposed in one of said one or more channels; and
a housing for holding said ferrule.

7. The connector of claim 6, wherein said first cross section has a y-dimension perpendicular to said first axis, and wherein said second cross section has essentially the same y-dimension.

8. The connector of claim 6, wherein said first cross section is a circle, and said second cross section is an oval or slot.

9. The connector of claim 6, further comprising a pin keeper disposed behind said ferrule and comprising two alignment pins that pass through said first and second alignment pin channels and project beyond said end face.

10. The connector of claim 6, wherein said one or more channels comprises two or more channels aligned parallel to said first axis.

11. The connector of claim 10, wherein said ferrule is an MT ferrule.

12. The connector of claim 11, wherein said connector is one or MPO-type, Lightray MPX-type, or MT-RJ type.

* * * * *

UNITED STATES PATENT AND TRADEMARK OFFICE
CERTIFICATE OF CORRECTION

Page 1 of 1

PATENT NO. : 8,585,300 B2
APPLICATION NO. : 13/023561
DATED : November 19, 2013
INVENTOR(S) : Buijs et al.

It is certified that error appears in the above-identified patent and that said Letters Patent is hereby corrected as shown below:

In the Claims

Col. 7, line 4, claim 12: "one or MPO-type," should read --one of MPO-type,--

Signed and Sealed this
First Day of September, 2015

Michelle K. Lee
*Director of the United States Patent and Trademark Office*